Jan. 25, 1966 L. E. FULLER 3,231,417
ZIRCON–BORON ABLATION COATING
Filed June 9, 1961
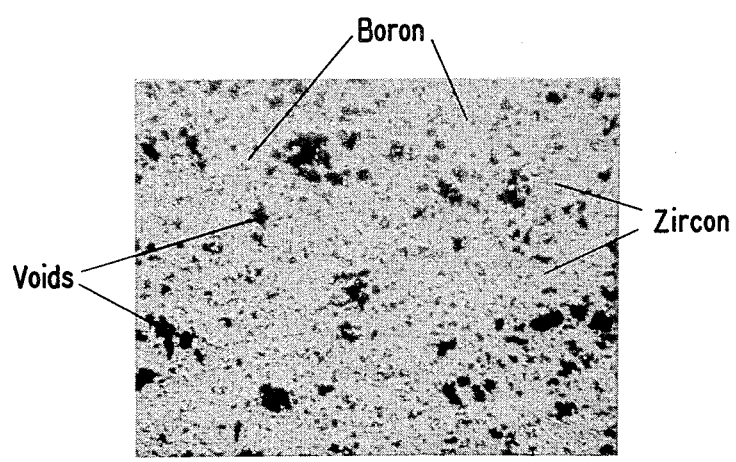
INVENTOR.
LYLE E. FULLER
BY
ATTORNEY

United States Patent Office 3,231,417
Patented Jan. 25, 1966

3,231,417
ZIRCON-BORON ABLATION COATING
Lyle E. Fuller, Indianapolis, Ind., assignor to Union
Carbide Corporation, a corporation of New York
Filed June 9, 1961, Ser. No. 115,916
6 Claims. (Cl. 117—105.2)

The present invention relates to a shock resistant, high temperature resistant article; it relates more particularly to an article having an outer protective coating possessing low thermally conductive characteristics, said coating being ablatable under severe heating conditions.

There is a present and ever-growing future need in the aeronautic and astronautic industries to provide protection to the outer surface and especially to the thin-walled nose section of super high velocity missiles or space vehicles as they re-enter and pass through the earth's atmosphere. Air or atmospheric friction, especially during the re-entry period of a space flight can effect an excessively high temperature build up in the exposed outer surface to cause gross melting or other failure of virtually all presently known structural materials.

One means for protecting such materials involves coating the outer surface of the fuselage and/or nose section of the high velocity projectile with a layer of material that will resist thermal damage under high heat flux conditions. The protective coating, in order to function properly, should have a high melting point and should also have the desirable properties of high resistance to thermal shock, low transmission of thermal energy through the coating as indicated by a low back face temperature, and relatively low density.

In accordance with present requirements, high altitude missile components such as a nose cone which is to re-enter the earth's atmosphere after outer space travel, are usually though not necessarily, thin-walled and light. The metal employed in the construction of this member may be stainless steel, titanium, aluminum, or similar high temperature resistant aircraft type materials. It has been found though that even when provided with special shapes to facilitate re-entry into the earth's atmosphere, such members, unless adequately cooled or heat shielded will literally burn up and be completely consumed in a very short time due to the amount of frictional heat developed.

It is, therefore, an object of the invention to provide an article adapted to withstand severe wearing conditions imposed by high frictional forces and high temperatures at the surface thereof.

A further object is to provide a relatively thin-walled coated article having an outer protected surface exposed to a high velocity and high temperature resulting from the frictional heat caused by re-entry of the article into the earth's atmosphere.

In the sole figure of the drawings the white area is the boron and the grey area is the zircon and the dark areas are voids.

In brief, the invention contemplates a relatively thin walled formed body or article which is provided on its outer surface with a lamellar layer, said layer being bonded to the article surface and comprising microscopic leaves which are disposed in overlapping, and interlocking relationship so as to be bonded to each other and to the said surface. The leaves comprising said layer are formed from comminuted particles of a coating composition made up of zircon and nickel, which particles are impinged at a high velocity by a hot gas stream against the surface to be coated. The particles on striking said surface are thereby deformed into a flattened leaf-like configuration.

The presently disclosed coating may be applied to the substrate material or article by any of several processes generally known to the art. For example, methods found to be suitable in forming the coatings are fully described and claimed in U.S. Patents Nos. 2,714,563 and 2,861,900. These methods include the detonation process and the jet plating process respectively. It has also been found that the plasma jet coating process described in co-pending application Serial No. 850,444, filed on November 2, 1959, now Patent No. 3,016,447, by R. M. Gage et al. may also be utilized.

To briefly and generically describe the aforementioned coating methods, an apparatus or gun is provided for receiving a highly detonatable gaseous mixture. As the mixture is ignited and the resulting gases caused to expand in a substantially confined chamber, the coating composition in finely powdered form may be introduced to the chamber or into the detonation stream. The chamber is provided with an egress passage leading into an elongated narrow barrel. As the hot, expanding gases pass from the chamber and into the gun barrel at a high velocity, the particles of coating material are conveyed therewith. These particles upon being heated in the gas stream may soften to a partially fluid state depending on the physical characteristics of the particular material.

Upon leaving the gun barrel, the softened, or fluidized particles are directed against and strike the surface to be coated at a high velocity. The effect of this action is to flatten or deform said particles into the microscopically thin, leaf-like configuration, said leaves thereby becoming bonded to the substrate surface and mutually to each other.

Successive detonations within the coating apparatus accompanied by successive additions of coating material caused a gradual build up of irregularly shaped and interlocked leaves into a composite lamellar layer.

In the jet plasma process mentioned above, a gas is also used as a heating and carrier medium. The gas in this instance though need not be detonatable, it may be an inert gas such as argon. A stream of the gas is heated to a high temperature by being passed between electric arc forming electrodes, and is thence constricted in a narrow passage to a flow having the required velocity. As in the previously described processes, particles of the coating metal are then injected into the rapidly flowing heated stream to be impinged against the work piece surface. The particles on striking said surface in a heat softened condition, deform and become bonded to each other and to the said surface in a lamellar layer.

The coating may be applied satisfactorily to various substrate surfaces so long as the surface is able to withstand the high temperature gas stream and is adapted to receive the coating material. As mentioned previously, this material may be stainless steel, aluminum, or titanium which have been formed into the desired shape. The thermally protected article contemplated by the present invention consists of a thin walled body as for example a missile nose cone, said body having bonded to the outer surface thereof a zircon-boron composite layer in which the zircon ($ZrSiO_4$) portion constitutes between 50 and 70 percent by volume, the remainder being boron. It is generally recognized in the art that during the course of applying a coating in one of the above-discussed methods, the finished coating composition as completed varies somewhat from the composition of the starting material due to changes or volitization which occurred during the coating process. For example, it has been found that coating compositions having a 65 volume percent zircon mixture, when applied by the abovementioned detonation plating process are found to have a final composition of about 60 volume percent zircon and 40 volume percent boron.

In an example of an article made by the above-discussed process, a powder mixture of 65 volume percent zircon (200 mesh), and 35 volume percent boron (200 mesh), was introduced to a plasma jet coating device employing argon as the torch gas. This powder mixture was injected into a hot argon stream and the resulting high velocity powder-gas effluent was impinged against the flat surface of a ¼-in. thick x 2-in. x 2-in. copper plate to form a ¼-in. thick zircon-boron coating. The resulting coating density on examination was determined to be about 3.0 grams/cm.$^3$.

The coated test piece was then disposed at a 45° angle and subjected to impingement thereon of the hot, high velocity gas flow from a plasma jet testing device under heat flux conditions of about 1000 B.t.u./ft.$^2$ sec. for 10 seconds. The gas jet was about ½-in. dia. and the coated test piece was positioned 1 inch from the discharge end of the arc device. These test conditions were established to simulate in the test piece friction heating of a coated missile component during the period while re-entering the earth's atmosphere. Subsequent examination of the test piece indicated that there was no gross spalling of the coating nor separation from the baseplate, which result indicated good resistance to thermal shock. It was observed that while the front face temperature of the coated plate averaged about 2150° C. during the test, the back face temperature rise was only about 90° C. thus indicating a rather low coefficient of thermal conductivity of the coating. For test purposes, the front face temperature was measured by an optical pyrometer while the back face temperature was measured by a thermocouple embedded in the base material near the coating interface. In this test, ablation protection for the base material was indicated by a coating volume loss of about 1.2 cm.$^3$ during the 10-second test.

The ability of the present novel coating to withstand damage at high heat flux conditions and thus protect the base material is believed to be due at least in part to the unique combination in the layer of high melting point and being a good thermal emitter so as to radiate heat away from the coated body.

Also, a desirable characteristic is the ability of the coating to ablate away when subjected to heat and abrasive friction, thereby dissipating a great deal of heat which would ordinarily reach the substrate material outer surface. While it is believed that useful ablation coatings can be prepared from coating mixtures containing from 50 to 70 volume percent zircon and 30 to 50 volume percent boron; 65 volume percent zircon to 35 volume percent boron is preferred. It is noted that the physical conditions of the boron used will have an effect on the composition range. For example, a powdered coating composition must be capable of being readily dispensed and fed into a coating device. It has been found that about 30–40 volume percent amorphous boron can be used while 30–50 percent is useful when the boron is crystalline.

What is claimed is:

1. A coating composition adapted to be applied to a metal substrate surface which comprises; comminuted particles in a mixture comprising between 50 and 70 percent by volume of zircon, the remainder being boron.

2. A wear resistant coating on a metallic work piece surface which comprises, a lamellar layer consisting of microscopic leaves disposed on said surface in overlapping and interlocking relationship as to be bonded to each other and to the surface, said layer consisting of from 60 to 65 percent by volume of zircon leaves, the remainder of said leaves being boron.

3. A coating substantially as described in claim 2 wherein the zircon leaves are present in the layer in an amount of about 60 percent by volume, the remainder of the leaves being boron.

4. Method of applying a wear resisting coating to a metallic surface which comprises, providing a surface to be coated, providing a device for discharging a heated flow of gas, introducing to said device a flow of the gas, heating said gaseous flow to an elevated temperature and directing said flow through a constricted orifice to obtain a high velocity gas stream, injecting into said heated high velocity stream a powdered coating mixture having in the composition thereof an amount of zircon particles between about 50 and 70 percent volume the remainder being boron, and impinging said particles against the surface to be coated whereby the heated particles may strike said surface and be deformed there against to form a lamellar, leaf-like layer of said particles bonded to each other and to said surface.

5. A high temperature resistant article characterized by thermal and shock resistance to a high velocity stream of fluid passing along the outer metallic surface thereof and being ablatable under such conditions, said article comprising a thin walled body having an external surface, said surface being provided with a coating layer having a lamellar structure consisting of microscopic leaves disposed in overlapping, and interlocking relationship, said leaves being bonded to each other and to the surface article without substantial alloying at the article-coating interface, said coating layer consisting of mutually bonded and intermixed leaf-life particles of zircon, and boron, the zircon leaves being present in a range of from 50 to 70 percent by volume of the coating layer, the remainder of said particles being boron.

6. A laminated product of manufacture characterized by thermal and shock resistance to high velocity streams contacting the outer metallic surface thereof, and being ablatable under such conditions, said article comprising a thin metallic wall defining the substrate of said laminated product, a coating bonded to said substrate to form a shock resistant thermal shield, said coating comprising a lamellar structure consisting of microscopic leaf-like particles disposed in over-lapping and interlocking relationship to cover said surface, said leaf-like particles being bonded to each other and to the substrate without substantial alloying at the interface thereof to form a layer having a density of about 3.0 grams of said coating per cubic centimeter, the proportional amounts of said leaves in the coating being about 50 to 70 percent by volume of zircon, the remainder being boron.

References Cited by the Examiner

UNITED STATES PATENTS

| | | | |
|---|---|---|---|
| 2,714,563 | 8/1955 | Poorman et al. | 117—105 |
| 2,822,302 | 2/1958 | McCaughna | 117—221 |
| 2,861,900 | 11/1958 | Smith et al. | 117—105 |
| 3,016,311 | 1/1962 | Stackhouse | 117—105 |
| 3,016,447 | 1/1962 | Gage et al. | 117—105 |
| 3,054,694 | 9/1962 | Aves | 117—71 X |

OTHER REFERENCES

Ingham et al.: Metallizing Handbook, vol. I and II, pp. B–15 and B–55, Metallizing Engineering Co., Westbury, L.I., N.Y., 1959.

WILLIAM D. MARTIN, *Primary Examiner.*

RICHARD D. NEVIUS, *Examiner.*